(12) United States Patent
Henrikson (10) Patent No.: US 7,766,213 B2
(45) Date of Patent: Aug. 3, 2010

(54) DEVICE AND METHOD FOR MONITORING A WELDING AREA AND AN ARRANGEMENT AND A METHOD FOR CONTROLLING A WELDING OPERATION

(75) Inventor: Per Henrikson, Trollhattan (SE)

(73) Assignee: Volvo Aero Corporation, Trollhattan (SE)

( * ) Notice: Subject to any disclaimer, the term of this patent is extended or adjusted under 35 U.S.C. 154(b) by 779 days.

(21) Appl. No.: 10/711,786

(22) Filed: Oct. 5, 2004

(65) Prior Publication Data
US 2005/0029326 A1     Feb. 10, 2005

Related U.S. Application Data

(63) Continuation of application No. PCT/SE03/00364, filed on Mar. 4, 2003, now abandoned.

(30) Foreign Application Priority Data
Apr. 5, 2002   (SE)   .................................... 0201057

(51) Int. Cl.
  *B23K 31/12*   (2006.01)
(52) U.S. Cl. ............................ 228/103; 228/8; 228/104
(58) Field of Classification Search ................ 228/102, 228/103, 104, 8
See application file for complete search history.

(56) References Cited

U.S. PATENT DOCUMENTS

| | | | | |
|---|---|---|---|---|
| 4,225,771 A | * | 9/1980 | Justice et al. ........... 219/137 R |
| 4,359,622 A | * | 11/1982 | Dostoomian et al. ........ 219/110 |
| 4,484,059 A | * | 11/1984 | Lillquist ................ 219/130.01 |
| 4,663,511 A | * | 5/1987 | Tallman .................. 219/121.13 |
| 4,767,911 A | * | 8/1988 | Maram et al. .......... 219/130.01 |
| 4,806,964 A | * | 2/1989 | Tamada et al. .............. 396/260 |
| 4,943,702 A | * | 7/1990 | Richardson ............ 219/124.34 |
| 5,283,418 A | * | 2/1994 | Bellows et al. ......... 219/130.01 |
| 5,475,198 A | * | 12/1995 | Burke et al. ............ 219/124.34 |
| 5,481,085 A | * | 1/1996 | Kovacevic et al. ..... 219/130.01 |
| 5,659,479 A | * | 8/1997 | Duley et al. .................. 700/166 |
| 6,060,685 A | * | 5/2000 | Chou et al. ............. 219/121.83 |
| 6,084,205 A | * | 7/2000 | Sheaffer et al. ........ 219/130.21 |
| 6,188,041 B1 | * | 2/2001 | Kim et al. .............. 219/121.63 |
| 6,221,068 B1 | * | 4/2001 | Fried et al. ..................... 606/8 |
| 6,555,780 B1 | * | 4/2003 | Kim et al. .............. 219/121.64 |
| 6,670,574 B1 | * | 12/2003 | Bates et al. ............ 219/121.64 |
| 6,762,831 B2 | * | 7/2004 | Shibata et al. ............ 356/237.2 |
| 2002/0154811 A1 | * | 10/2002 | Katsuta et al. .............. 382/151 |

FOREIGN PATENT DOCUMENTS

| | | | |
|---|---|---|---|
| JP | 05217335 A | * | 8/1993 |
| JP | 11-187111 A | | 7/1999 |
| NL | 8201673 A | | 11/1983 |

* cited by examiner

*Primary Examiner*—Roy King
*Assistant Examiner*—Michael Aboagye
(74) *Attorney, Agent, or Firm*—Novak Druce + Quigg LLP (57) ABSTRACT

Method and device (2) for monitoring a welding area of an object (14) in connection with welding, which device includes arrangements (3) for reproduction of the welding area, at least one filter (4) arranged in front of or in the reproduction arrangement (3), and an illumination arrangement (5) of the welding area with ultraviolet radiation. The filter (4) consists of a band-pass filter which is adapted for filtering around a wavelength within the ultraviolet wavelength range.

29 Claims, 6 Drawing Sheets

DEVICE AND METHOD FOR MONITORING A WELDING AREA AND AN ARRANGEMENT AND A METHOD FOR CONTROLLING A WELDING OPERATION

CROSS-REFERENCE TO RELATED APPLICATIONS

The present application is a continuation patent application of International Application No. PCT/SE03/00364 filed 4 Mar. 2003 which was published in English pursuant to Article 21(2) of the Patent Cooperation Treaty, and which claims priority to Swedish Application No. 0201057-7 filed 5 Apr. 2002. Said applications are expressly incorporated herein by reference in their entireties.

FIELD OF THE INVENTION

The present invention relates to a device for monitoring a welding area of an object during a welding process. The device comprises (includes, but is not necessarily limited to) means for reproduction of the welding area, at least one filter arranged in front of, or in the reproduction means, and means for illumination of the welding area with ultraviolet radiation. The reproduction means can consist of, for example, a video camera, and in particular, those of the CCD (Charge Couple Device) type. An image produced is suitably displayed on a TV monitor. In a complementary embodiment, the invention also relates to a method for monitoring the welding area.

The present invention moreover relates to an arrangement for controlling a welding operation, while the operation is ongoing, comprising means for welding, a monitoring device as above, means for processing an image produced by the reproduction means, and means for controlling one or more welding parameters and/or the position of the welding head on the basis of information from the image. The invention furthermore relates to a method for controlling the welding operation.

BACKGROUND OF THE INVENTION

In order to obtain high quality of the weld and reduced costs for a welded article, today, use is made of automated welding processes in which various types of sensors measure, for example, the position of the welding joint in front of the weld, gap and misalignment between the parts which are to be welded together, or the width of the welding joint as a basis for controlling the welding process. It is previously known to make use of video cameras, for example, an analog or digital CCD camera, in order to create an image of the welding area. Use is also made of a computer with a real-time image-processing program, which is connected to the camera. This makes possible automatic measurement in the image. With the aid of the measured information, a welding robot or a welding apparatus is controlled, it being possible to regulate the welding process online.

The light from the arc and the heat radiation (blackbody radiation) from the melt must be attenuated in order for it to be possible to see or detect the melt, and details in the melt, with the camera. The image created by the camera will otherwise be unevenly exposed on account of the highly luminous area around the arc and the melt. According to previously known systems, there are problems associated with producing a precise image of the welding area with a great amount of detailed information.

A previously known such device for monitoring the welding area is described in Japanese Patent Application, JP 11187111. Therein, use is made of a stroboscope that emits ultraviolet radiation so as to illuminate the welding area. Furthermore, a camera is arranged in order to reproduce the welding area. The shutter of the camera is synchronized with the stroboscope.

SUMMARY OF THE INVENTION

One object of the invention is to provide a device for monitoring the welding area that affords opportunities for producing an image of the welding area with a greater amount of detailed information and/or precision in relation to previously known systems.

This object is achieved by virtue of the fact that the filter consists of a band-pass filter that is adapted for filtering around a wavelength within the ultraviolet wavelength range. Such a device can be used for, for example, supervising the welding process and studying the melt in detail, together with any special phenomena occurring in the melt. Examples of such phenomena can include circulation flow, phase transition from molten to solid material, the geometrical shape and raising of the melt above the material, the presence of slag formation and also the appearance of oxidation. The welding area which is monitored/supervised can, for example, comprise one or more of the joint to be welded, the melt and the solidified weld.

According to a preferred embodiment of the invention, the filter wavelength is centered around a wavelength at which the illumination means emits rays. Use is made of, for example, a mercury lamp as the radiation source. The mercury spectrum has a number of spectral lines which lie at specific wavelengths, and the filter wavelength is centered around one or more of these.

According to a preferred embodiment of the invention, the wavelength lies within a wavelength range of 280-450 nm. This broadest definition of the embodiment also includes part of the short-wave visible wavelength range which borders on the ultraviolet range; that is to say, the range between roughly 380 and 450 nm. It has been found that very good results can be achieved with a band-pass filter for filtering in the upper ultraviolet wavelength range, beyond the visible range, between roughly 300 and 380 nm. Especially good results have been achieved with a band-pass filter adapted for filtering at a wavelength of approximately 365 nm and a band-pass filter adapted for filtering at a wavelength of approximately 320 nm.

According to another preferred embodiment of the invention, the band-pass filter is adapted for narrow-band filtering. The band-pass filter is adapted for filtering within a range which is smaller than 90 nm FWHM around the filter wavelength and preferably within a range which is approximately 10 nm FWHM. FWMH is a generally accepted measure of band filter width and stands for Full Width at Half Maximum.

Another object of the invention is to provide an arrangement for controlling a welding operation, while it is ongoing, which affords opportunities for a welded article with a higher weld quality in relation to the prior art.

This object is achieved by an arrangement comprising a monitoring device which further comprises means for reproduction of the welding area, at least one filter arranged in front of or in the reproduction means, and means for illumination of the welding area with ultraviolet radiation. The filter comprises a band-pass filter that is adapted for filtering around a wavelength within the ultraviolet wavelength range. The arrangement also comprises computer means for processing an image produced by the reproduction means, and means for controlling one or more welding parameters and/or the position of the welding head of the welding means on the basis of information from the image.

According to a preferred embodiment of the invention, the image processing means is adapted to measure the weld width from the image. The welding parameters are subsequently controlled from this weld width.

Still another object of the invention is to provide a method for monitoring the welding area which affords opportunities for producing an image of the welding area with a greater amount of detailed information and/or precision in relation to previously known systems for similar purposes. This object is achieved by virtue of the fact that the welding area is illuminated with ultraviolet radiation, the welding area being reproduced, the radiation from the welding area in a direction toward a means for the reproduction being filtered, and the filtering being carried out with a band-pass filter around a wavelength within the ultraviolet wavelength range.

Yet another object of the invention is to provide a method for controlling a welding operation which affords opportunities for a welded article with a higher weld quality in relation to previously known systems.

This object is achieved by virtue of the fact that the welding area is illuminated with ultraviolet radiation, the welding area being reproduced, the radiation from the welding area in a direction toward a means for the reproduction being filtered, filtering being carried out with a band-pass filter around a wavelength within the ultraviolet wavelength range, and an image produced by the reproduction means being processed by computer and one or more welding parameters and/or the position of a welding head being controlled on the basis of information from the image.

It should also be appreciated that further preferred embodiments and advantages of the invention will emerge to those persons skilled in these arts based on the present disclosure.

BRIEF DESCRIPTION OF THE DRAWING FIGURES

The invention will be described in greater detail below with reference to the embodiments shown in the accompanying drawings, and in which.

DETAILED DESCRIPTION OF PREFERRED EMBODIMENTS

Figure 1:
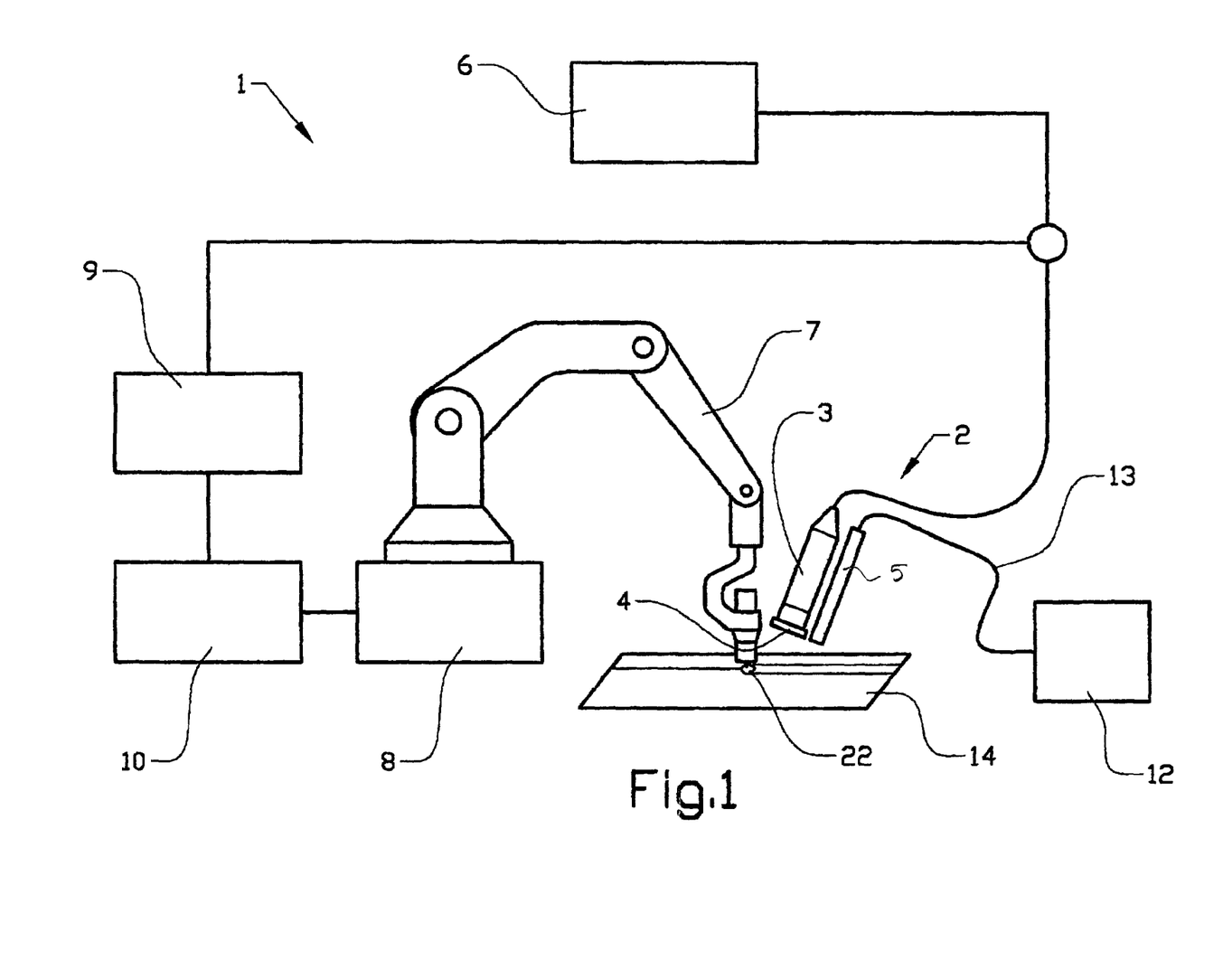
FIG. 1 is a diagrammatical representation showing a first embodiment of an arrangement for controlling a welding operation configured according to the present invention.
Figure 2:
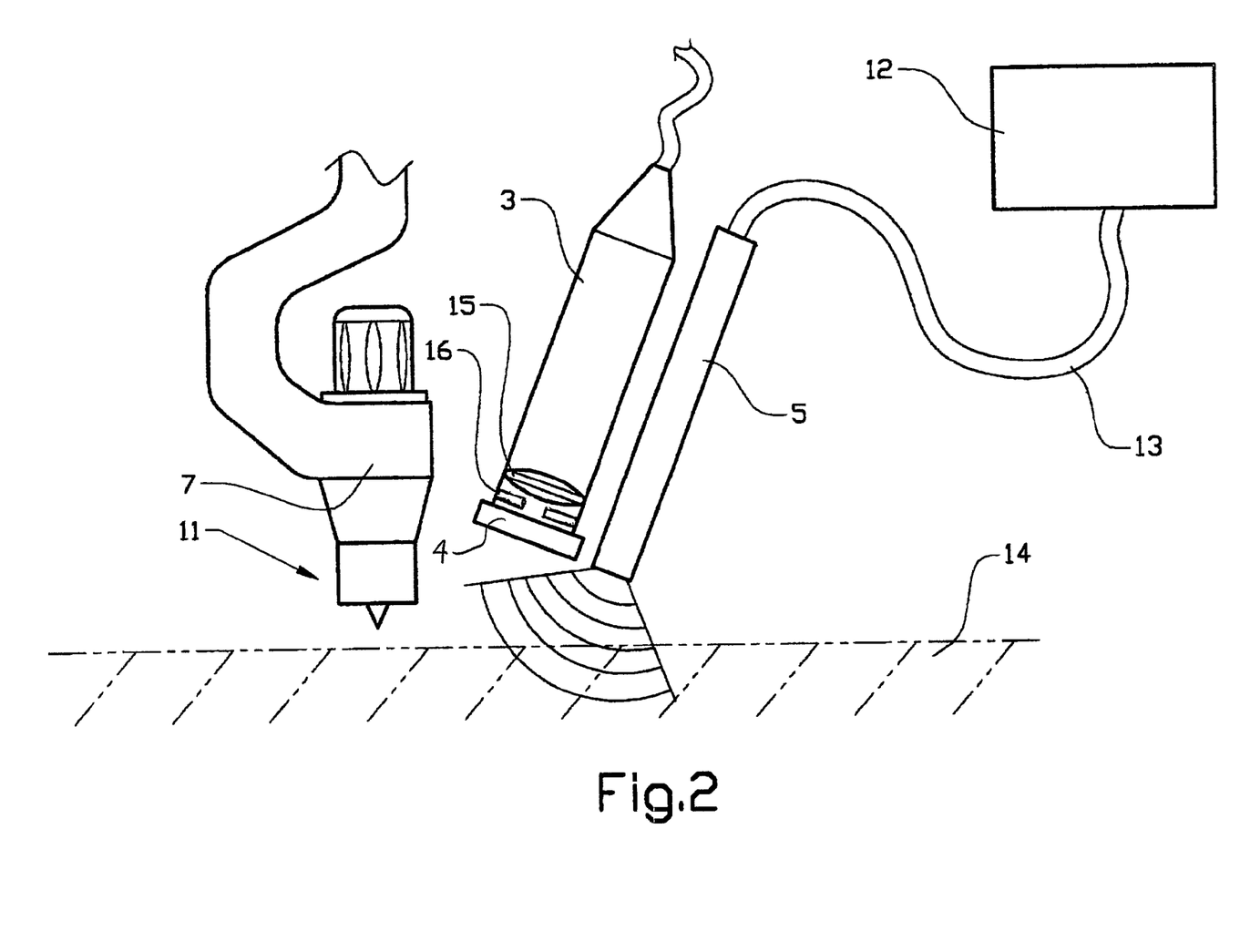
FIG. 2 is a diagrammatical representation showing an enlarged illustration of the relative positioning of the welding head, the camera and the radiation source of FIG. 1.

FIGS. 1 and 2 show a first embodiment of an arrangement 1 for controlling a welding operation configured according to the teachings of the present invention. The control arrangement 1 comprises a device 2 for monitoring, or supervising, a welding area of an object 14. The device 2 comprises means 3 for reproduction of the welding area, which means 3 consists of a camera, a band-pass filter 4 arranged in front of a lens 15 of the camera, and means 5 for direct illumination of the welding area with ultraviolet radiation. The reproduction means 3 and the illumination means 5 are arranged on the same side of a welding means 7, in the form of a welding robot, and more specifically behind the melt 22 in the welding direction. As illustrated, the means 3 for reproduction of the welding area is situated such that the view of the welding area which it obtains—in this case, a direct view—is oriented at an oblique angle relative to the axis of the welding means 7. The object 14 can consist of, for example, two plates to be welded together.

The filter 4 is adapted for separating out specific wavelengths originating from light emitted from the welding area, such as radiation and reflection from the electrode, arc and the melt. The filter 4 consists of a narrow-band interference filter for filtering specific wavelengths within the ultraviolet range. The welding area is therefore illuminated with ultraviolet radiation at the same time as the camera registers only radiation within a narrow-band ultraviolet range. The filter wavelength is adapted to, more specifically, be centered around one or more wavelengths at which the illumination means emits rays.

As illustrated, the illumination means 5 exemplarily consists of a nozzle or outlet for the illumination that is coupled to a UV radiation source 12 via an optical light guide, such as a fiber conductor 13, and is adapted for illumination—direct illumination in this embodiment—of the welding area at a suitable angle.

According to the first embodiment, the reproduction means 3 and the illumination means 5 are arranged essentially parallel and adjacent to one another.

The monitoring device also comprises means 6 for displaying an image of the welding area produced by the camera. This imaging means exemplarily consists of a TV monitor or display unit. With the aid of the TV monitor, detailed visualization of the welding procedure can be achieved. The camera 3 is therefore connected to the TV monitor 6.

The camera 3 suitably consists of a miniature video camera, such as a CCD or CMOS (Charge Metal Oxide Conductor) camera. The control arrangement 1 also comprises the means 7 for welding, which consists of a welding robot comprising a welding head 11 (see FIG. 2).

The control arrangement 1 also comprises means 9 for processing an image produced by the camera 3, which means 9 comprises a central processing unit (CPU), or computer. The control arrangement 1 also comprises means 10 for controlling one or more welding parameters and/or the position of the welding head 11 on the basis of information produced from the image. The central unit 9 is therefore connected to the camera 3 and to the control means 10 of the welding robot 8.

The central unit 9 comprises software for image-processing and more specifically for measuring the width of the weld directly from the image. This is usually referred to as a real-time image-processing system. When the width of the weld is measured according to the proposed method, use is made of, for example, an edge-detection algorithm or some other type of image-processing algorithm which utilizes contrast differences for measuring the weld width. In this case, the material properties and the oxidation appearing on the material during welding have a favorable effect in terms of creating contrast differences in the image. This is especially marked in the case of welding stainless steel, such as 316L.

More specifically, the computer 9 compares the measured weld width (Wl) with a reference value for the nominal weld width (Wr) and calculates a deviation (e) as a difference between the measured weld width and the reference value (e=Wr−Wi). The value of the deviation is then sent to the control means 10 of the welding robot 8. On the basis of the measured weld width, or more specifically the calculated deviation (e), specific welding parameters, such as welding speed, welding current and welding voltage and/or spacing between the welding head 11 and the object 14 for welding, and the like are then controlled. In the present case, the weld width is measured online, and the welding penetration is controlled directly on the basis of measured weld width.

The present invention is aimed primarily at monitoring and controlling arc welding, specifically TIG (Tungsten Inert Gas) welding, which is also referred to as GTAW (Gas Tungsten Arc Welding). It can, however, also be used for other fusion welding methods where the energy supply is effected by, for example, gas flame or laser welding with infrared radiation, or by means of another energy supply using, for example, electromagnetic radiation in another spectral range, charged particles, or electric or acoustic heating. The invention can be applied for welding various materials, for example stainless steel, Inconel 718 and Greek-Ascoloy, but is not in any way limited to these materials. In FIGS. 1-6, the invention is shown in a case where welding is performed without filler material. However, the invention is not limited to this, but can also be applied for welding with a filler material.

By supplying ultraviolet radiation in combination with narrow-band filtering, it is possible to obtain homogeneous exposure of the image with improved image quality in relation to known systems for such purposes. An additional effect of the combination of ultraviolet illumination and simultaneous filtering is that the majority of the ultraviolet radiation from the arc and the melt is filtered out. This affords opportunities for looking straight (i.e., directly) into the melt at the welding electrode (in combination with an attenuating filter) without the radiation from the melt saturating the camera. This makes it possible to measure the geometrical extent of the melt, and therefore the weld width. A further effect of the exposure to ultraviolet light is that the contrast and wealth of detail in the image of the melt and the solidification area are increased considerably.

In the present example, the camera 3 consists of a CCD camera with spectral sensitivity to wavelengths greater than 280 nm. The camera has built-in automatic gain control (AGC), and the narrow-band interference filter 4 is arranged in front of the receiving lens 15. As an alternative, the filter is arranged between the lens and the camera detector. As a further alternative, or complement, the camera comprises an aperture (iris) which provides suitable exposure. According to the first embodiment, a diaphragm 16, in the form of an iris diaphragm, is arranged in front of the camera for controlling the exposure and the depth of field in the image. The diaphragm diameter can be varied and may, for example, lie in the range 0.5-2.0 mm, and the diameter 1.4 mm has proved to be suitable for measuring the weld width. The focal length of the lens preferably lies in the range 8-15 mm. A focal length of 12 mm has produced good results. These examples are to be regarded only as non-limiting examples of the diaphragms and lenses.

The camera 3 and the illumination means 5 are suitably mounted on the welding head 7 via a holder, or a frame (not shown). The camera 3 looks in toward the welding melt from the rear and from above at a suitable angle in relation to the welding head, preferably 10-80 degrees, and according to the first embodiment, roughly 70°. The invention is nevertheless not in any way limited to this specific configuration, but the camera can, for example, be arranged so as to look into the welding melt from the front or from the side, suitably at an angle of 10-80°.

According to an alternative, or complement, to the weld-width measurement described, it is also possible to use the arrangement for joint-tracking. According to a first variant of the first embodiment, the arrangement is used only for joint-tracking. In this application, the camera for joint-tracking is mounted in front of the welding head in its intended direction of movement and looks straight (i.e., directly) in toward the welding area, as illustrated. The illumination means is arranged on the same side of the welding area as the camera; that is to say, in front of the welding area. According to a second variant of the first embodiment, the weld-width measurement is carried out in combination with joint-tracking. The arrangement is then used with the relative positioning of the camera and the illumination means according to the first variant. It is thus possible to detect in one and the same image the joint and a front portion of the melt. By measuring the position of the joint in the image and comparing this with the position of the melt, it would be possible in real time, with an image-processing system, to control the weld so that it follows the joint. The method could also be used for measuring the gap between the plates to be welded in direct proximity to the melt.

The UV radiation source 12 is adapted for emission of radiation in the range 280-450 nm, in particular in the range 280-380 nm, and preferably in the range 320-380 nm. Here, the UV radiation source 12 consists of a mercury lamp. The spectrum of the mercury has a number of strongly emitting UV spectral lines which lie on the following wavelengths: 302 mm, 313 mm, 334 mm, 365 mm, 405 mm and 435 mm.

The radiation source 12 is also adapted so that the UV light fills the viewing field of the camera well and can be applied at different angles, preferably so that the quantity of radiation is maximized in the direction of the CCD camera. In this way, the intensity from the object (the useful signal) in the image is increased in relation to the surrounding background level (radiation and reflections from the arc and the welding melt), and, in this way, a more homogeneous exposure level is obtained in the image, with very detailed information about the welding melt and its surrounding environment.

It has been found that very good results are achieved by filtering around certain of the abovementioned spectral lines. The interference filter has a bandwidth which is centered so that it transmits radiation from one or more of these spectral lines depending on the bandwidth of the filter. In the first place, use is made of the spectral line at 365 mm. The mercury spectrum has a powerful light peak at this wavelength. At this wavelength, which lies relatively close to the visible range, the camera has high sensitivity at the same time as the camera optics give good reproduction of the welding area.

It has moreover been found that very good results are achieved by filtering in the lower part of the spectral range; that is to say, at wavelengths which are shorter than 350 nm. In this range, the effect of a highly luminous area produced in the image by the arc and the melt is reduced. Particularly good results have been achieved at wavelengths shorter than 330 nm. In the second place, use is made of filtering at 320 nm. The filtering is preferably carried out at wavelengths longer than 290 nm and in particular longer than or approximately 300 nm. A preferred wavelength for the filtering lies within the UV range between 300 and 370 nm.

The band-pass filter is also adapted for narrow-band filtering, more specifically within a range smaller than 90 nm FWHM around the wavelength. The filter has a narrow bandwidth owing to the fact that the arc from the welding flame also emits rays in the UV range. The band-pass filter is preferably adapted for filtering within a range smaller than 70 nm FWHM, especially smaller than 50 nm FWHM, and in particular smaller than 30 nm FWHM around the wavelength.

The band-pass filter is especially adapted for filtering within a range smaller than 20 nm FWHM, and in particular within a range which is approximately 10 nm FWHM, but filtering within a smaller range is also possible, such as 5 nm FWHM.

A large number of different combinations of wavelength and band-pass are therefore possible. According to a first preferred example, use is therefore made of a band-pass filter with the wavelength 365 nm and 10 nm FWHM. According to a second preferred example, use is made of a band-pass filter with the wavelength 320 nm and 10 nm FWHM. According to a third preferred example, use is made of a band-pass filter with the wavelength 402 nm and 10 nm FWMH.

The filter 4 is also adapted for filtering within a certain wavelength band which is tailored to the wavelength range with which the illumination means is adapted to illuminate. Conversely, it would be possible to compensate for a specific selected filter with the radiation supplied. It is therefore possible to envisage a large number of different combinations of wavelength range for emitted light and filter.

Further examples of band-pass filter which have given good results are: 300 nm (10 nm FWHM), 310 nm (10 nm FWHM), 330 nm (10 nm FWHM), 342 nm (10 nm FWHM), 400 nm (25 nm FWHM), 402 nm (36 nm FHWM), 419 nm (10 nm FWMH).

Apart from the width of the weld, it is possible to obtain a great deal of information from the image of the welding area and to control the welding parameters and/or the spacing between the welding head 11 and the object 14 for welding on the basis of this information. Examples of such information are: the width of the melt, the geometry or shape (that is to say, ovality, surface smoothness and the like) of the melt, the characteristics of the arc (the width, projected size and the like of the arc), and the position and the shape of the flow eddies which can occur in the melt.

Figure 3:
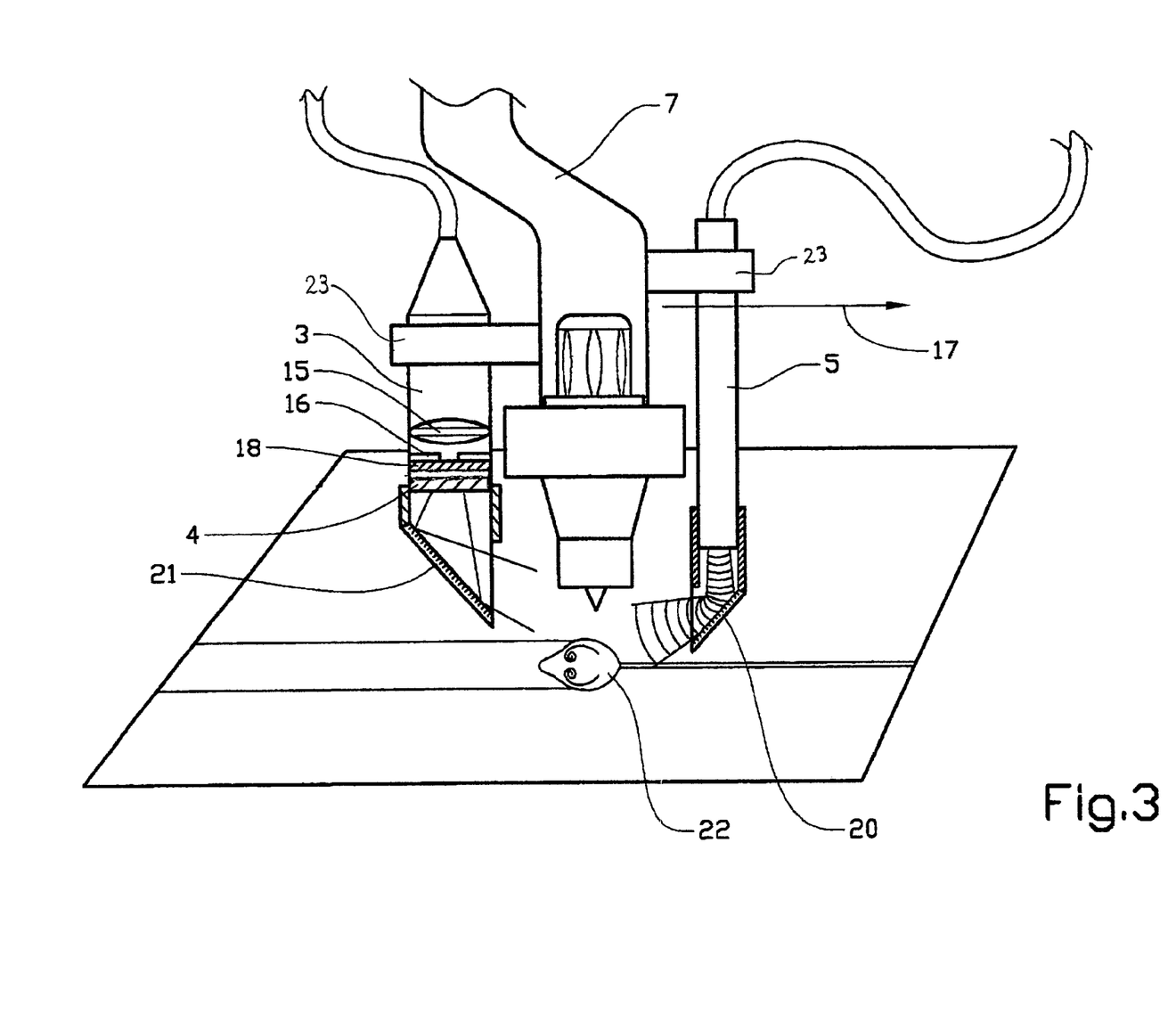
FIG. 3 is a diagrammatical representation showing a second embodiment of an arrangement for controlling a welding operation corresponding to FIG. 2.

FIG. 3 illustrates a second preferred embodiment of the arrangement of illumination means (light guide) 5, band-pass filter 4 and reproduction means (camera) 3. Here, the camera 3 is arranged on the opposite side of the welding means 7 in relation to the light guide 5. The camera 3 and the light guide 5 are also mounted on the welding head 7 via a diagrammatically illustrated holder, or a frame, 23 so as to be held generally near the welding means 7. The welding means 7 is intended to be moved in a direction toward the right in the figure (see arrow 17); that is to say, along the joint to be welded, the light guide 5 and the camera 3 remaining in front of and, respectively, behind the welding area during welding.

Arranged between the camera 3 and the band-pass filter 4 in order from the camera are the lens 15, the diaphragm 16, and a further filter 18, preferably in the form of an attenuating filter. The diaphragm 16 according to the second embodiment has, relative to the diaphragm according to the first embodiment, a considerably smaller aperture, preferably smaller than 1 mm in diameter, and suitably in the range 0.5-1.0 mm. The attenuating filter is of the ND (Neutral Density) filter type and suitably has a density factor of 0.5-3.0. Such an ND filter attenuates all wavelengths to the same degree, and therefore also those which pass through the band-pass filter. Because of the ND filter, it is possible to look straight through the arc, and the conditions for studying the geometry of the melt, and melt phenomena which occur, are thus improved.

In this example, the camera 3 and the illumination means 5 are arranged so that they extend essentially vertically; that is to say, essentially at right angles to the surface and parallel to the welding head 7. The UV light is therefore emitted vertically downward from the illumination means. A first mirror 20 is arranged under the illumination means 5 and is inclined at a suitable angle, preferably the same as or close to the angle of the first mirror so as to reflect to the camera the UV illumination reflected by the welding area. In a corresponding way, a second mirror 21 is arranged under the camera 3 and is inclined at a suitable angle so as to reflect to the camera the UV illumination reflected by the welding area. Despite the fact that the camera 3 extends vertically, i.e., essentially at a right angle to the surface and parallel to the welding head 7, its overall relative arrangement—with the second mirror 21 being located in front of it and at an appropriate angle relative to both the axis of the camera 3 and the surface—allows the camera 3 to obtain a reflected view of the welding area that is oriented at an oblique angle relative to the axis of the welding head 7 and relative to the surface, as illustrated. Thus, this second embodiment, where the camera 3 and the illumination means are arranged next to and along the welding head 7, affords opportunities for a relatively compact device.

The UV radiation from the illumination means 5 is reflected in the melt area toward the camera at a relatively small angle, the same as or virtually the same as the viewing angle of the camera, virtually parallel to the surface, suitably 10-40° and preferably roughly 20°. This provides a very bright image of the geometry of the melt with a very low background level of reflected radiation from the welding electrode and the arc.

With the aid of this device, it is possible, for example, to measure or supervise the width and geometrical shape of the melt, and which may have a drop shape, an elliptical shape, or a circular shape or the like. It is furthermore possible to monitor the surface of the melt and to see the surface flow in the melt, such as eddies, and to supervise process variations, pulsations and the like. It is also possible to see depression and/or deformation of the surface caused by the pressure from the arc. It is furthermore possible to see the dynamic behavior of the melt. It is therefore possible to obtain a great deal of information about the melt, and, from this information, conclusions can be drawn about the welding process. When the camera is arranged in front of the weld, it is also possible to detect the position of the joint in front of the weld and, from this information, to vary the position of the welding head.

The welding process can therefore be regulated at an early stage directly on the basis of information from the molten zone.

At this relatively small angle of the camera 3 and the illumination means 5 relative to the surface, in particular the width of the melt and the position or rotational speed in the melt of circulation flow eddies can be measured, or at least supervised, with great precision.

The flow on the surface of the melt is visualized because of particles/slag/impurities present on, or added to the welded material.

The device could be used for controlling the welding process on the basis of information about the characteristics of the arc. For example, the lateral extent or projected size of the arc could constitute welding parameters for the welding process. It would also be possible to use the flow phenomena observed in the melt as control parameters. For example, the position and/or rotational speed in the melt of the circulation eddies could be used.

According to a variant of this embodiment, the welding robot is moved in the opposite direction relative to the arrow 17; that is to say, toward the left in the FIG. The camera 3 then observes the melt from the front. In addition to the information mentioned above, it is then moreover possible to measure the position of the joint in relation to the melt and the gap between the plates to be welded at the same time as the position of the joint and the position of the weld are monitored.

Figure 4:
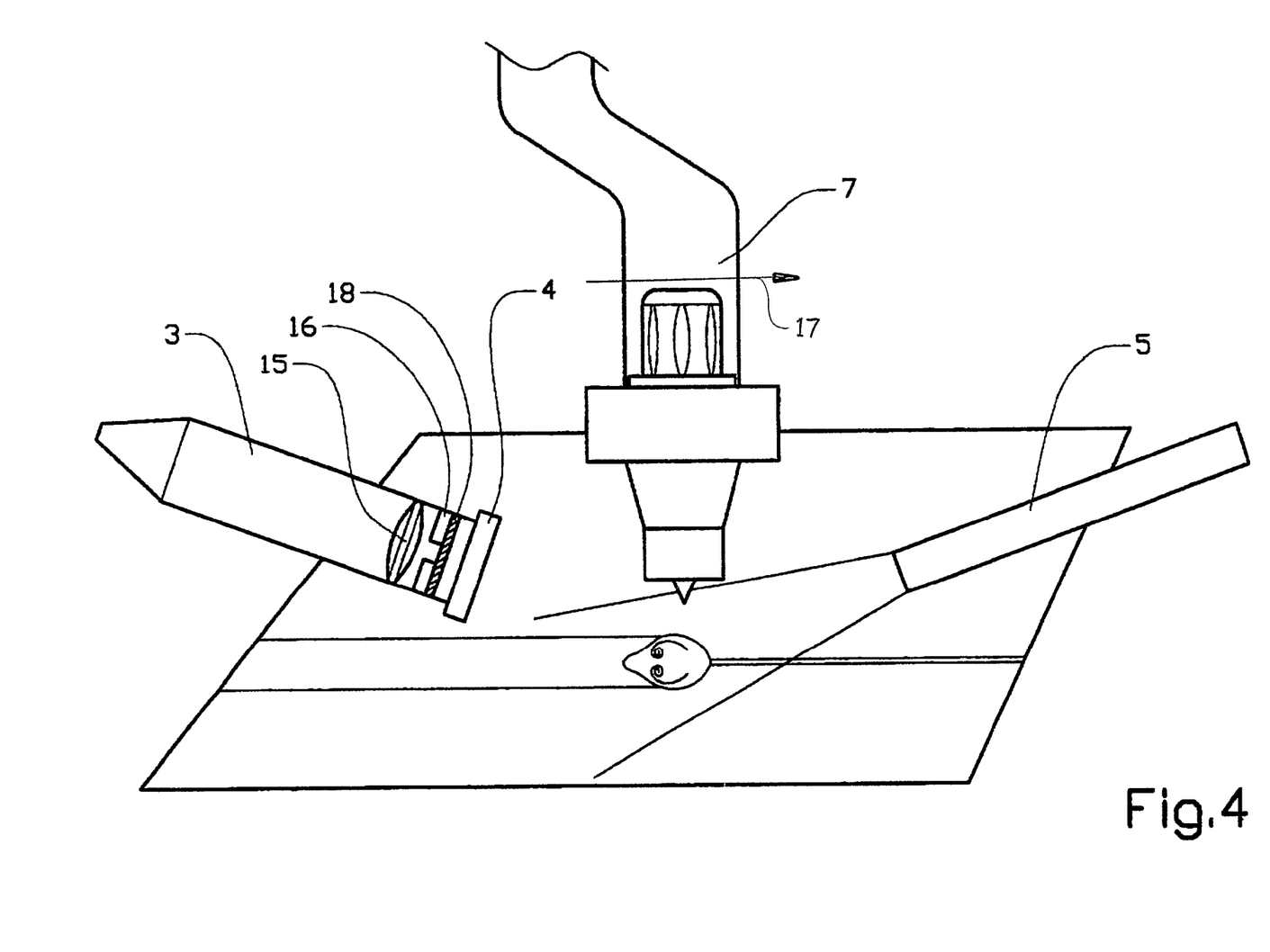
FIGS. 4, 5 and 6 are diagrammatical representations showing a third, fourth and fifth embodiment of an arrangement for controlling a welding operation, which embodiments are variants of the second embodiment.
Figure 5:
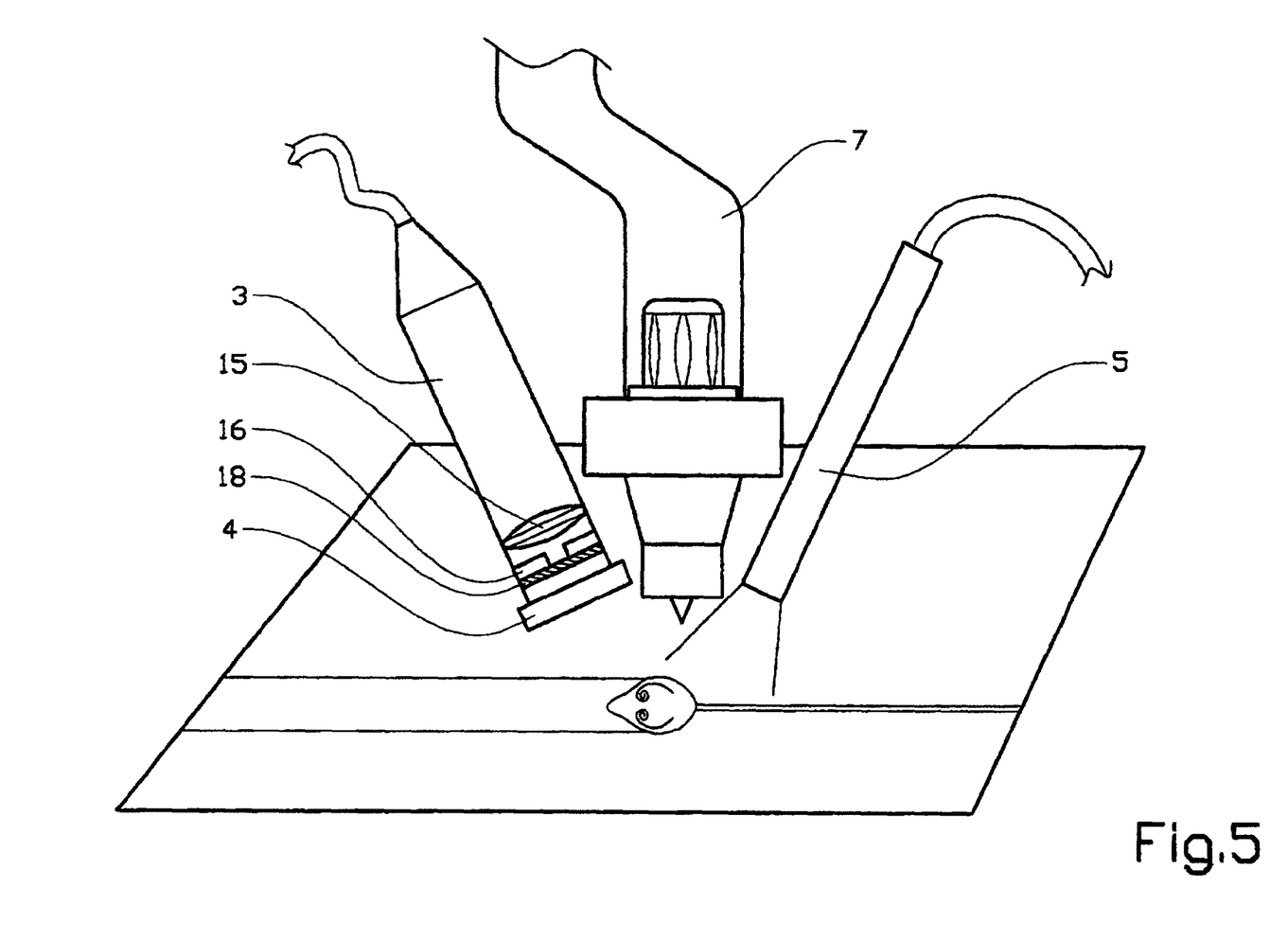

FIG. 4 illustrates a third embodiment of the invention. The difference in this embodiment in relation to the second embodiment is that the illumination means 5 and the camera 3 are arranged at a relatively small angle, suitably 10-40 degrees, and preferably roughly 20 degrees in relation to the surface. The illumination means 5 illuminates the welding area directly; that is to say, without an intermediate mirror, and the camera 3 is aimed directly at the welding area, which is to say without an intermediate mirror. FIG. 5 shows a fourth embodiment of the invention. The difference in this embodiment in relation to the third embodiment is that the illumination means 5 and the camera 3 are arranged at a relatively great angle, suitably 45-85 degrees and preferably roughly 65 degrees in relation to the surface. At this relatively great angle of the camera 3 and the illumination means 5 relative to the surface, in particular the shape (that is to say, ovality and the like) and size (of the surface area) of the melt can be measured with great precision.

Figure 6:
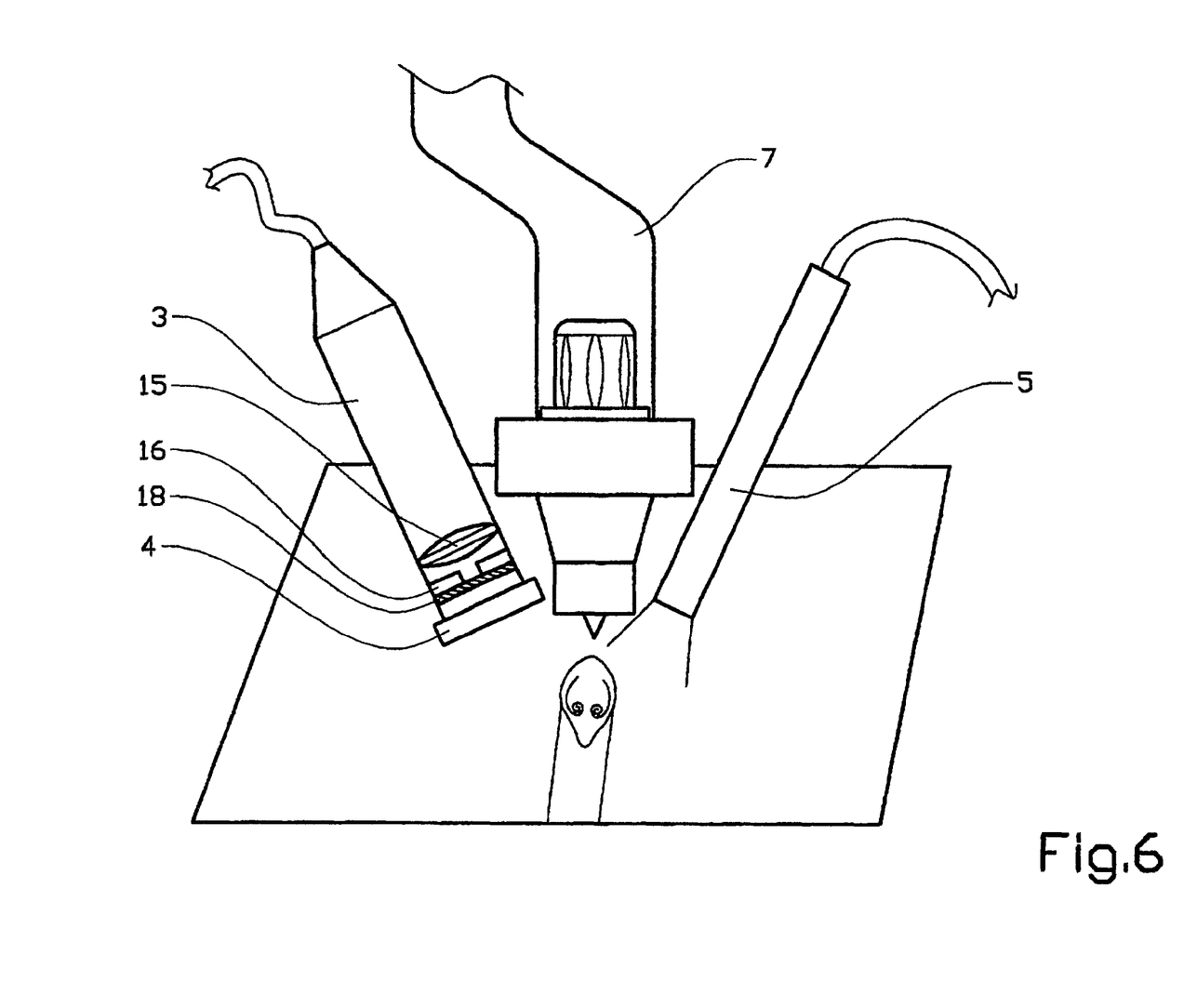

FIG. 6 shows a fifth embodiment of the invention. The difference in this embodiment in relation to the third embodiment is that the illumination means 5 and the camera 3 are arranged on different sides of the joint to be welded. The camera 3 is therefore arranged so that it looks in toward the joint (directly, in this embodiment) from the side, essentially at 90° to the welding direction. The illumination means 5 is arranged on the opposite side of the joint, essentially at 90° to the welding direction, for illumination of the welding area (directly, in this embodiment) from the side. The welding means 7 is intended to be moved forward; that is to say, upward in the figure. The light guide 5 and the camera 3 remain on different sides of the welding area during welding. In this way it is possible to obtain information about the length of the melt and a certain idea of the shape of the melt.

The CPU 9 comprises a memory, which in turn comprises a computer program with computer program segments, or a program code, for implementing the measurement method when the program is run. This computer program can be transmitted to the central unit 9 in various ways via a transmission signal, for example by downloading from another computer, via wire and/or wirelessly, or by installation in a memory circuit. In particular, the transmission signal can be transmitted via the Internet.

The invention also relates to a computer program product comprising computer program segments stored on a computer-readable means for implementing the measurement method when the program is run. The computer program product can consist of, for example, a diskette.

Exemplarily, the UV radiation source is adapted so as to provide continuous illumination.

The invention is not to be regarded as being limited to the illustrative embodiments described herein, but a number of further variants and modifications are conceivable within the scope of the patent claims. For example, use can be made of a combination of one or more of the embodiment(s) described above, such as arranging both illumination means and camera on both sides of the welding means 7.

The computing means 9 for processing an image produced by the camera 3 and the means 10 for controlling one or more welding parameters could consist of one and the same unit, such as a computer.

As an alternative UV radiation source, laser radiation, or another type of potential UV emitter, could be used for the radiation.

The welding means 7 does not necessarily have to comprise a welding robot, but, according to at least one alternative, use is made of a conventional welding apparatus without autonomous functioning.

Further, the monitoring device can be used on its own; that is to say, only for monitoring, supervising or studying the welding area and the phenomena which occur without various welding parameters or the movement of the welding means being controlled.

According to the embodiments above, use has been made of a narrow-band, band-pass filter which is centered around only one spectral line. Alternatively, it is possible to envision using a broad-band filter which transmits a number of spectral lines. One advantage of this would be that the total radiation power to the welding area would thus be increased. At the same time, however, the amount of undesirable background radiation transmitted through the filter would increase.

According to the second embodiment, the diaphragm 16 is a separate part. In some cameras, however, the diaphragm (the aperture) is integrated into the lens. This of course also lies within the scope of the invention.

What is claimed is:

1. A method for monitoring a welding area of an object (14) during a welding process that utilizes a welding head, said method comprising:
   during said welding process, illuminating the welding area with ultraviolet radiation of a predetermined ultraviolet wavelength by means of a source other than said welding head;
   using a means (3) for reproducing, reproducing the welding area while it is being welded; and
   filtering radiation from the welding area in a direction toward said means (3) for reproducing, said filtering being carried out using a band-pass filter (4) around the predetermined ultraviolet wavelength.

2. The method as recited in claim 1, wherein said predetermined wavelength lies within a wavelength range of 280-450 nm.

3. The method as recited in claim 1, wherein said predetermined wavelength is shorter than 400 nm.

4. The method as recited in claim 1, wherein said predetermined wavelength is shorter than 380 nm.

5. The method as recited in claim 1, wherein said predetermined wavelength is longer than 300 nm.

6. The method as recited in claim 1, wherein said predetermined wavelength is approximately 365 nm.

7. The method as recited in claim 1, wherein said predetermined wavelength is approximately 320 nm.

8. The method as recited in claim 1, wherein said band-pass filter (4) is adapted for filtering within a range which is smaller than 90 nm FWHM around said predetermined wavelength.

9. The method as recited in claim 1, wherein said band-pass filter (4) is adapted for filtering within a range which is smaller than 70 nm FWHM around said predetermined wavelength.

10. The method as recited in claim 1, wherein said band-pass filter (4) is adapted for filtering within a range which is smaller than 30 nm FWHM around said predetermined wavelength.

11. The method as recited in claim 1, wherein said band-pass filter (4) is adapted for filtering within a range which is approximately 10 nm FWHM around said predetermined wavelength.

12. The method as recited in claim 1, further comprising:
   using image-analyzing means, analyzing a reproduction image of the welding area produced by the reproducing means (3); and
   controlling at least one welding parameter and/or the position of said welding head (11) based on information obtained by said analyzing said reproduction image.

13. The method as recited in claim 12, wherein the width of a reproduced welding joint is measured by said image-analyzing means and said at least one welding parameter and/or the position of said welding head (11) is/are controlled on the basis of the measured weld width.

14. The method as recited in claim 13, wherein the measured weld width is compared with one or more reference values and, in the event of deviation from an approved range being detected, said at least one welding parameter and/or the position of said welding head (11) is/are adjusted.

15. The method as recited in claim 12, wherein the position of a welding joint and a gap between two parts to be welded together and the geometry of a weld melt are detected, and said at least one welding parameter and/or the position of said welding head (11) is/are controlled on the basis thereof.

16. The method of claim 1, wherein the reproducing means (3) obtains a view of the welding area that is oriented at an oblique angle relative to the axis of the welding head.

17. The method of claim 16, wherein the reproducing means (3) views the welding area directly.

18. The method of claim 17, wherein the reproducing means (3) obtains a reflected view of the welding area.

19. The method of claim 1, wherein the source of ultraviolet radiation illuminates the welding area directly.

20. The arrangement of claim 1, wherein the source of ultraviolet radiation illuminates the welding area indirectly, via reflection.

21. A method for monitoring a welding area of an object (14) during a welding process that uses a welding head, said method comprising:
   illuminating the welding area with ultraviolet radiation;
   reproducing the welding area with a means for reproducing; and
   filtering radiation from the welding area in a direction toward said means (3) for reproducing, said filtering being carried out using a band-pass filter (4) around a wavelength within the ultraviolet wavelength range, and wherein said band-pass filter (4) is adapted for filtering within a range which is smaller than at least one of the following: (a) 90 nm FWHM around said filter wavelength, (b) 70 nm FWHM around said filter wavelength, (c) 30 nm FWHM around said filter wavelength, and (d) 10 nm FWHM around said filter wavelength.

22. An arrangement (1) for real-time control of a welding operation that utilizes a welding head (11), said arrangement comprising:
   a device (2) for monitoring a welding area of an object (14) during welding, said device (2) comprising
   means for reproducing (3) the welding area;
   at least one filter (4) arranged in front of or in the reproducing means (3); and
   a source of ultraviolet radiation, other than said welding head (11), that is configured and disposed so as to illuminate the welding area with ultraviolet radiation having at least one predetermined ultraviolet wavelength when the welding operation is being performed;
   wherein said filter (4) comprises a band-pass filter configured for filtering around the predetermined ultraviolet wavelength;
   a CPU-based device (9) having installed thereon image-analyzing means for analyzing a reproduction image of the welding area produced by the reproducing means (3); and
   a controller (10) that receives information based on analysis of the reproduction image that has been performed by the image-analyzing means and that controls at least one welding parameter and/or the position of the welding head (11) on the basis of said information.

23. The arrangement as recited in claim 22, wherein said image-analyzing means (9) is adapted to measure weld width from the reproduction image.

24. The arrangement as recited in claim 22, wherein said image-analyzing means (9) is adapted to detect at least one of the position of a welding joint, a gap between two parts to be welded together, and geometry of a weld melt.

25. The arrangement of claim 22, wherein the reproducing means (3) is arranged such that it obtains a view of the welding area that is oriented at an oblique angle relative to the axis of the welding means 7.

26. The arrangement of claim 25, wherein the reproducing means (3) is arranged so as to view the welding area directly.

27. The arrangement of claim 25, further comprising a mirror that is positioned so as to permit the reproducing means (3) to obtain a reflected view of the welding area.

28. The arrangement of claim 22, wherein the source of ultraviolet radiation is arranged so as to illuminate the welding area directly.

29. The arrangement of claim 22, further comprising a mirror that is positioned such that the source of ultraviolet radiation illuminates the welding area indirectly, via reflection.

* * * * *